(12) United States Patent
Li et al.

(10) Patent No.: US 8,077,968 B2
(45) Date of Patent: Dec. 13, 2011

(54) IMAGE PROCESSING METHOD

(75) Inventors: Jyun-Sian Li, Tainan (TW);
Chih-Chang Lai, Taichung County (TW); Ching-Fu Hsu, Taichung County (TW); Ruey-Shing Weng, Kaohsiung (TW)

(73) Assignee: Wintek Corporation, Taichung (TW)

( * ) Notice: Subject to any disclaimer, the term of this patent is extended or adjusted under 35 U.S.C. 154(b) by 605 days.

(21) Appl. No.: 12/265,681

(22) Filed: Nov. 5, 2008

(65) Prior Publication Data

US 2009/0116740 A1    May 7, 2009

(30) Foreign Application Priority Data

Nov. 6, 2007   (TW) ................................ 96141850 A

(51) Int. Cl.
*G06K 9/00*    (2006.01)
(52) U.S. Cl. ...................................................... 382/167
(58) Field of Classification Search ................. None
See application file for complete search history.

(56) References Cited

U.S. PATENT DOCUMENTS

| | | | |
|---|---|---|---|
| 6,317,157 B1 * | 11/2001 | Takayama | 348/441 |
| 6,721,000 B1 | 4/2004 | Lin et al. | |
| 7,006,251 B2 | 2/2006 | Fujino | |
| 7,265,795 B2 * | 9/2007 | Ohyama et al. | 348/675 |
| 7,486,417 B2 * | 2/2009 | Baek | 358/1.9 |
| 7,705,810 B2 * | 4/2010 | Choi et al. | 345/77 |

OTHER PUBLICATIONS

Yeong-Taeg Kim, "Contrast Enhancement Using Brightness Preserving Bi-Histogram Equalization," IEEE Transactions on Consumer Electronics, vol. 43, No. 1, Feb. 1997, pp. 1-8.
Tien-Chu Hsu et al., "P-29: Fuzzy Contrast Correction (FCC) for Image Contrast Enhancement," SID 06 Digest, pp. 303-305.
Erno H. A. Langendijk et al., "43.2: More Realistic Colors from Small-Gamut Mobile Displays," SID 04 Digest, pp. 1258-1261.

* cited by examiner

*Primary Examiner* — Yuzhen Ge
(74) *Attorney, Agent, or Firm* — Jianq Chyun IP Office

(57) ABSTRACT

An image processing method for individually processing an image of each pixel unit is provided. A red-green-blue color space signal to be input to a pixel unit is transformed into a first brightness signal. The red-green-blue color space signal includes a first red signal, a first green signal and a first blue signal. The first brightness signal is transformed into a second brightness signal to obtain a contrast factor, wherein the contrast factor is a ratio of the second brightness signal and the first brightness signal. The first red signal, the first green signal and the first blue signal are multiplied by the contrast factor to obtain a second red signal, a second green signal and a second blue signal. The second red signal, the second green signal and the second blue signal are performed by color enhancement to obtain a high contrast and colorful image.

18 Claims, 4 Drawing Sheets

IMAGE PROCESSING METHOD

CROSS-REFERENCE TO RELATED APPLICATION

This application claims the priority benefit of Taiwan application serial no. 96141850, filed on Nov. 6, 2007. The entirety of the above-mentioned patent application is hereby incorporated by reference herein and made a part of specification.

BACKGROUND OF THE INVENTION

1. Field of the Invention

The present invention relates to an image processing method. More particularly, the present invention relates to an image processing method, which may individually process an image of each single pixel unit.

2. Description of Related Art

Image processing includes adjustment of image information such as color and brightness of an image. With a growing demand in high quality digital image, digital image processing technique is being rapidly developed. Regardless of how dark or how bright a digital image is, contrast, brightness and color saturation etc. of the digital image may be improved after the image processing.

Presently, a commonly used image processing method for enhancing image contrast and adjusting image brightness is based on a histogram equalization technique. In brief, the histogram equalization technique is to redistribute brightness values of all pixels of a whole image, such that the brightness and the contrast of the whole image may be distributed more evenly. In other words, based on the histogram equalization technique, a relatively dark image or a relatively bright image may be modified to obtain a normal color gamut. For example, the relatively dark image may gain some bright pixels after the histogram equalization is performed, and the relatively bright image may gain some dark pixels after the histogram equalization is performed.

However, though the image contrast may be improved, the image brightness may be adjusted and the color saturation problem may be solved based on the histogram equalization technique, such technique may lead to a distortion of image hue and color saturation. Moreover, the histogram equalization technique requires performing calculation on a large amount of data, and therefore additional frame memory is required, which may further increase complexity and cost of hardware.

Accordingly, based on U.S. Pat. No. 6,721,000, an image signal to be input to a single pixel is transformed into a YUV color space, and the elements U and V representing chrominance thereof may be multiplied with a factor S(Y,U,V) to increase the color saturation. However, if this method is applied to the pixel with high color saturation, a clipping phenomenon may be occurred to a portion of the image information, and original relatively fine solution of the image may be lost. Therefore, in the SID2004 conference, an image processing method for mitigating the clipping phenomenon of the image information is disclosed by Philips Research Laboratories in an article entitled "More Realistic Colors from Small-Gamut Mobile Displays". However, this method is performed based on adding add white color to the original image data, such that the image processed by this method may have a phenomenon of partial white.

Therefore, the above image processing methods all have their shortcomings, in which true presentation of original image hue cannot be achieved while simultaneously improving the color saturation and contrast of the image. If a simple image processing technique may be provided for compensating the color saturation and contrast of the image, and meanwhile the image hue remains unchanged, the image processing technique may be greatly improved.

SUMMARY OF THE INVENTION

The present invention is directed to an image processing method, by which image processing may be performed within a memory having relatively small volume, and the image processing method is conduce to improve an image contrast and achieve a colorful image while maintaining image hue unchanged.

The present invention provides an image processing method for individually processing an image of each pixel unit. The image processing method may be described as follows. First, a red-green-blue color space signal to be input to a pixel unit is transformed into a first brightness value, wherein the red-green-blue color space signal includes a first red value, a first green value and a first blue value. Next, the first brightness value is transformed into a second brightness value to obtain a contrast factor, wherein the contrast factor is a ratio of the second brightness value and the first brightness value. Finally, the first red value, the first green value and the first blue value are multiplied by the contrast factor to obtain a second red value, a second green value and a second blue value.

In an embodiment of the present invention, if the first red value is R, the first green value is G and the first blue value is B, the first brightness value is Y, and R, G, B and Y satisfy a formula (1): $Y=0.299R+0.587G+0.114B$.

In an embodiment of the present invention, the method of transforming the first brightness value into the second brightness value may be described as follows. A curve function is provided, and the first brightness value is input to the curve function to obtain the second brightness value. Now, if the first brightness value is less than "a" and is greater than 0, the second brightness value obtained based on calculation of the curve function is less than or equal to the first brightness value; if the first brightness value is greater than "a" and less than 255, the second brightness value obtained based on calculation of the curve function is greater than the first brightness value; and if the first brightness value is "a", 0 or 255, the second brightness value obtained based on calculation of the curve function is equal to the first brightness value. Wherein, "a" is a value between 0~255, or between 60~70, and "a" preferably has a value of 66.

In an embodiment of the present invention, the first brightness value and the second brightness value are respectively between 0~255.

In an embodiment of the present invention, the image processing method further comprises the following steps. First, a maximum difference among the first red value, the first green value and the first blue value is transformed into a color enhancement factor. Next, a first formula, a second formula and a third formula are obtained based on the color enhancement factor. Finally, the second red value, the second green value and the second blue value are respectively input to the first formula, the second formula and the third formula to obtain an output red value, an output green value and an output blue value.

In an embodiment of the present invention, a relationship between the maximum difference and the color enhancement factor may be described as follows. If the maximum difference is greater than 178, the color enhancement factor is 0; if the maximum difference is greater than 162 and less than 178, the color enhancement factor is 0.05; if the maximum difference is greater than 146 and less than 162, the color enhancement factor is 0.10; if the maximum difference is greater than 130 and less than 146, the color enhancement factor is 0.15; if the maximum difference is greater than 114 and less than 130, the color enhancement factor is 0.20; if the maximum difference is greater than 98 and less than 114, the color enhancement factor is 0.25; if the maximum difference is greater than 82 and less than 98, the color enhancement factor is 0.30; if the maximum difference is greater than 66 and less than 82, the color enhancement factor is 0.35; if the maximum difference is greater than 50 and less than 66, the color enhancement factor is 0.40; if the maximum difference is greater than 34 and less than 50, the color enhancement factor is 0.45; if the maximum difference is greater than 18 and less than 34, the color enhancement factor is 0.50; if the maximum difference is greater than 8 and less than 18, the color enhancement factor is 0.55; if the maximum difference is less than 8, the color enhancement factor is 0.60.

In an embodiment of the present invention, if the color enhancement factor is S, the second red value is R', the second green value is G', the second blue value is B', the output red value is Ro, the output green value is Go and the output blue value is Bo, the first formula then is $Ro=((1+S) \times R'-S/2 \times G'-S/2 \times B')$, the second formula is $Go=(-S/2 \times R'+(1+S) \times G'-S/2 \times B')$, and the third formula is $Bo=(-S/2 \times R'-S/2 \times G'+(1+S) \times B')$.

The present invention provides another image processing method for individually processing an image of each pixel unit. The image processing method may be described as follows. First, a maximum difference among a first red value, a first green value and a first blue value to be input to a pixel unit is transformed into a color enhancement factor. Next, a first formula, a second formula and a third formula are obtained based on the color enhancement factor. Next, the first red value, the first green value and the first blue value are respectively input to the first formula, the second formula and the third formula to obtain a second red value, a second green value and a second blue value. Next, the second red value, the second green value and the second blue value are transformed into a first brightness value, and the first brightness value is transformed into a second brightness value, so as to obtain a contrast factor, wherein the contrast factor is a ratio of the second brightness value and the first brightness value. Finally, the second red value, the second green value and the second blue value are multiplied by the contrast factor to obtain an output red value, an output green value and an output blue value.

In an embodiment of the present invention, if the color enhancement factor is S, the first red value is R, the first green value is G, the first blue value is B, the second red value is R', the second green value is G' and the second blue value is B', the first formula then is $R'=((1+S) \times R-S/2 \times G-S/2 \times B)$, the second formula is $G'=(-S/2 \times R+(1+S) \times G-S/2 \times B)$, and the third formula is $B'=(-S/2 \times R-S/2 \times G+(1+S) \times B)$.

In an embodiment of the present invention, a relationship between the maximum difference and the color enhancement factor may be described as follows. If the maximum difference is greater than 178, the color enhancement factor is 0; if the maximum difference is greater than 162 and less than 178, the color enhancement factor is 0.05; if the maximum difference is greater than 146 and less than 162, the color enhancement factor is 0.10; if the maximum difference is greater than 130 and less than 146, the color enhancement factor is 0.15; if the maximum difference is greater than 114 and less than 130, the color enhancement factor is 0.20; if the maximum difference is greater than 98 and less than 114, the color enhancement factor is 0.25; if the maximum difference is greater than 82 and less than 98, the color enhancement factor is 0.30; if the maximum difference is greater than 66 and less than 82, the color enhancement factor is 0.35; if the maximum difference is greater than 50 and less than 66, the color enhancement factor is 0.40; if the maximum difference is greater than 34 and less than 50, the color enhancement factor is 0.45; if the maximum difference is greater than 18 and less than 34, the color enhancement factor is 0.50; if the maximum difference is greater than 8 and less than 18, the color enhancement factor is 0.55; if the maximum difference is less than 8, the color enhancement factor is 0.60.

In an embodiment of the present invention, the method of transforming the first brightness value into the second brightness value may be described as follows. First, a curve function is provided, and the first brightness value is input to the curve function to obtain the second brightness value. Now, if the first brightness value is less than "a" and is greater than 0, the second brightness value obtained based on calculation of the curve function is less than or equal to the first brightness value; if the first brightness value is greater than "a" and less than 255, the second brightness value obtained based on calculation of the curve function is greater than the first brightness value; and if the first brightness value is "a", 0 or 255, the second brightness value obtained based on calculation of the curve function is equal to the first brightness value. Wherein, "a" is a value between 0~255, or between 60~70, and "a" preferably has a value of 66.

In an embodiment of the present invention, the first brightness value and the second brightness value are respectively between 0~255.

In an embodiment of the present invention, if the second red value is R', the second green value is G' and the second blue value is B', the first brightness value then is Y, and R', G', B' and Y satisfy a formula (1): $Y=0.299R'+0.587G'+0.114B'$.

According to the image processing method of the present invention, image signals to be input to every pixel unit are individually processed, so as to increase the contrast and the color saturation of the image of each pixel unit. Therefore, the image processing method of the present invention requires a relatively small memory volume, and applying of additional memory is not necessary, such that the cost and size of electronic device are reduced. Moreover, according to the image processing method of the present invention, a high image contrast and colorful image may be obtained while maintaining image hue unchanged.

In order to make the aforementioned and other objects, features and advantages of the present invention comprehensible, a preferred embodiment accompanied with figures is described in detail below.

DESCRIPTION OF EMBODIMENTS

In a conventional image processing method, image data of a whole image is first calculated to form a histogram, and then contrast and color saturation of the whole image are adjusted, and therefore a relatively large memory volume is required for performing the calculation. If such image processing method is applied to a display device with a medium or a small size, size of the display is then limited and cannot be reduced. Recently, a method of performing independent calculation on each image signal to be displayed on each pixel unit is provided, so as to reduce the required memory volume. However, such method still cannot maintain an original image hue, and may lead to a clipping phenomenon to a portion of the image information. In other words, the conventional image processing method cannot achieve an optimal image processing effect under a relatively small memory volume. Accordingly, the present invention provides a novel image processing method. However, the following embodiments are only used for describing the spirit and scope of the present invention, and are not used for limiting the scope of the present invention.

First Embodiment

Figure 1:
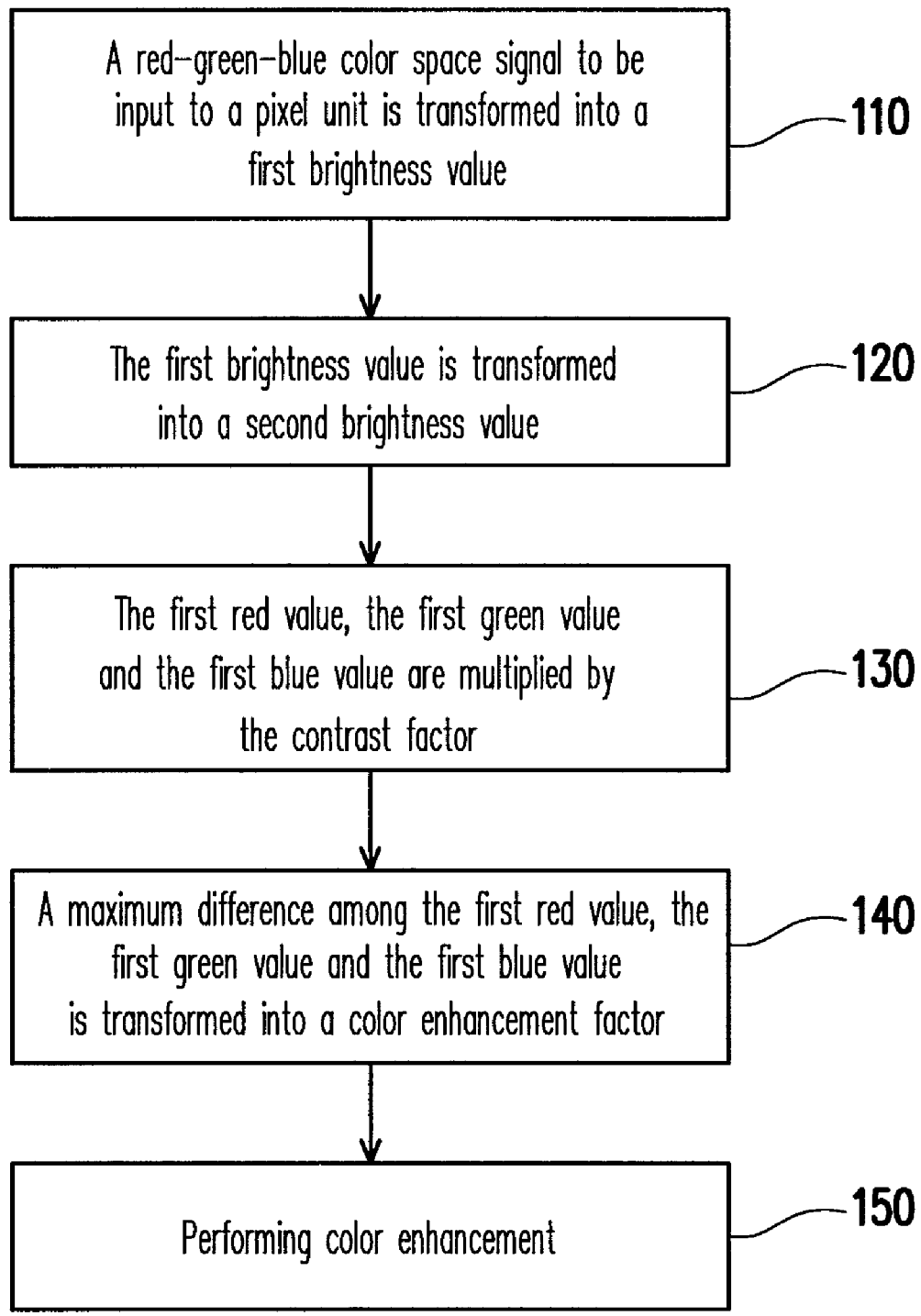
FIG. 1 is a flowchart illustrating an image processing method according to a first embodiment of the present invention.

FIG. 1 is a flowchart illustrating an image processing method according to a first embodiment of the present invention. In the image processing method of the present invention, image signals to be displayed by every pixel unit are individually processed. First, referring to FIG. 1, in step 110, a red-green-blue color space signal to be input to a pixel unit is transformed into a first brightness value, wherein the red-green-blue color space signal includes a first red value, a first green value and a first blue value. More particularly, the red-green-blue color space signal is an image signal composed of red, green and blue sub-signals, i.e. a RGB color space signal, hereinafter, the red-green-blue color space signal is referred to as the RGB color space signal. In the present embodiment, the RGB color space signal is first transformed into a YUV color space signal, wherein Y signal is the first brightness value. Actually, if the first red value is R, the first green value is G and the first blue value is B, the first brightness value then is Y, and R, G, B, Y may satisfy the equation (1): Y=0.299R+0.587G+0.114B. Namely, when the RGB color space signal is about to be transformed into the YUV color space signal, the value of Y of the YUV color space signal is obtained based on calculation of the equation (1).

Figure 2:
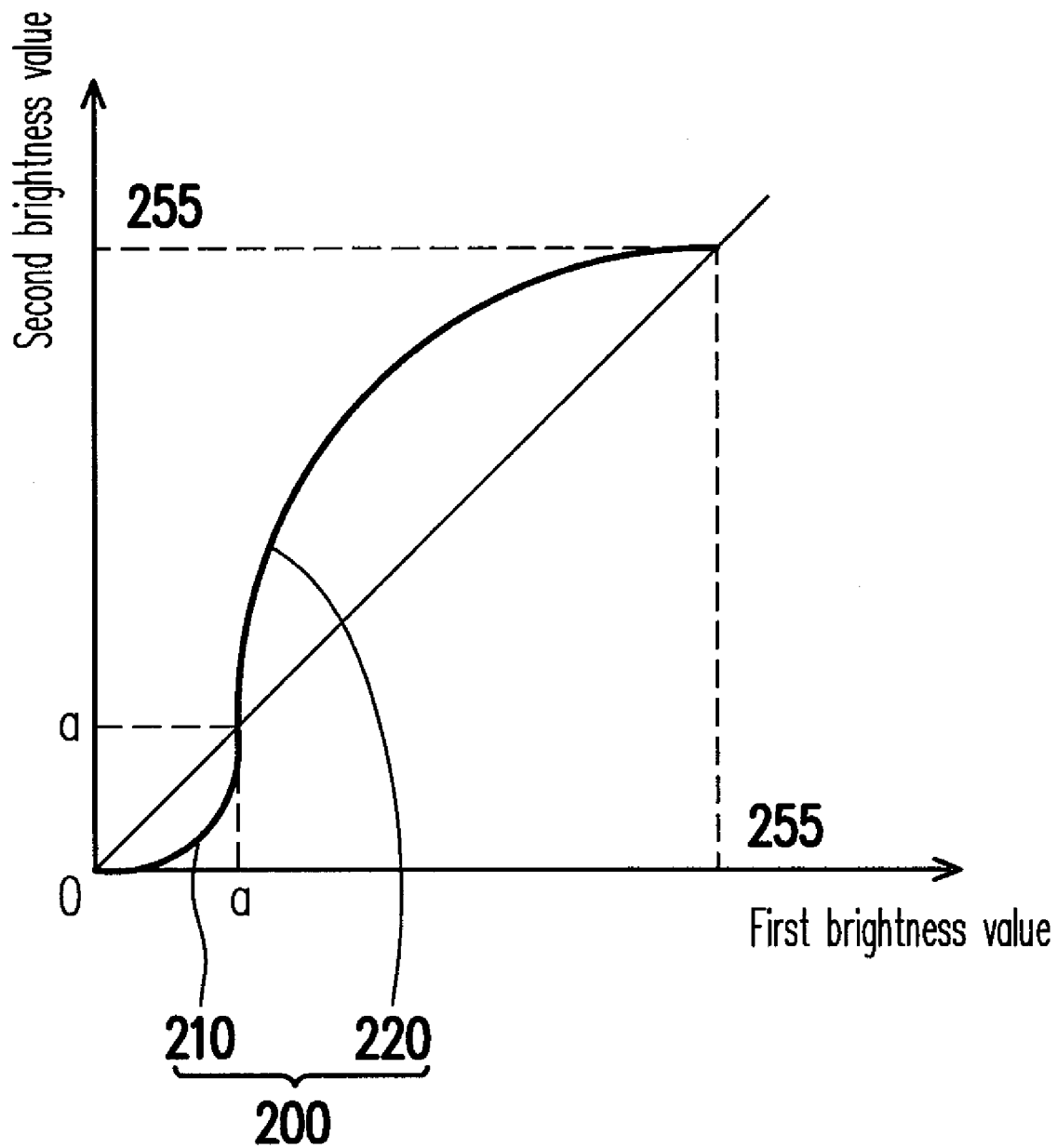
FIG. 2 is a diagram illustrating a curve for a curve function according to an embodiment of the present invention.

Next, in step 120, the first brightness value obtained based on calculation of the equation (1) is transformed into a second brightness value. The method of transforming the first brightness value into the second brightness value is as follows. A curve function is provided, and the first brightness value is input to the curve function to obtain the second brightness value. The curve function of the present embodiment may be represented by a curve 200 illustrated in FIG. 2, wherein the horizontal axis represents the first brightness values, and the vertical axis represents the second brightness values. Referring to FIG. 2, if the first brightness value is less than "a" and is greater than 0, the second brightness value obtained based on calculation of the curve function is less than the first brightness value; if the first brightness value is greater than "a" and less than 255, the second brightness value obtained based on calculation of the curve function is greater than the first brightness value; and if the first brightness value is "a", 0 or 255, the second brightness value obtained based on calculation of the curve function is equal to the first brightness value.

More particularly, the curve 200 may be composed of two curves with different curving directions. If the first brightness value is within a range of 0~a, the curve 200 may be a curve segment 210 curving upwards. Moreover, if the first brightness value is within the range of a~255, the curve 200 may be a curve segment 220 curving downwards. Wherein, "a" may have a value corresponding to an actual requirement. Actually, "a" is a value between 0~255, or between 60~70, and preferably has a value of 66.

In detail, if the first brightness value is less than "a", based on calculation of the curve function of the curve 200, the second brightness value which is less than the first brightness value is then obtained, and if the first brightness value is greater than "a", the second brightness value which is greater than the first brightness value is then obtained. Actually, based on the transformation of the step 120, the relatively dark image data may be darker, and the relatively bright image data may be brighter, and therefore the image contrast is improved. Moreover, the first brightness value and the second brightness value are respectively between 0~255, and a ratio of the second brightness value and the first brightness value may be regarded as a contrast factor.

Next, referring to FIG. 1 again, in step 130, the first red value, the first green value and the first blue value are respectively multiplied by the contrast factor to obtain a second red value, a second green value and a second blue value. Since the contrast factor is the ratio between the second brightness value obtained based on calculation of the curve function and the first brightness value, the image data with relatively high contrast then may be obtained by respectively multiplying the first red value, the first green value and the first blue value with the contrast factor. In other words, the image processing step for increasing the contrast may be accomplished by respectively multiplying the first red value, the first green value and the first blue value with the contrast factor.

Assuming the contrast ratio between the second brightness value and the first brightness value is k, and the second red value, the second green value and the second blue value obtained according to the contrast ratio are respectively R', G' and B', the hue of the image data then may be calculated by the following equation based on the second red value, the second green value and the second blue value:

$$H' = 60° \times \frac{G' - B'}{R' - B'} = 60° \times \frac{kG - kB}{kR - kB} = 60° \times \frac{G - B}{R - B} = H$$

Wherein H is the hue of the original image. In other words, after the image processing step for increasing the contrast, the hue H' of the image data maintains unchanged, namely, distortion of the image may be avoided.

Next, in step 140, a maximum difference among the first red value, the first green value and the first blue value is transformed into a color enhancement factor. A relationship between the maximum difference and the color enhancement factor is as follows. If the maximum difference is greater than 178, the color enhancement factor is 0; if the maximum difference is greater than 162 and less than 178, the color enhancement factor is 0.05; if the maximum difference is greater than 146 and less than 162, the color enhancement factor is 0.10; if the maximum difference is greater than 130 and less than 146, the color enhancement factor is 0.15; if the maximum difference is greater than 114 and less than 130, the color enhancement factor is 0.20; if the maximum difference is greater than 98 and less than 114, the color enhancement factor is 0.25; if the maximum difference is greater than 82 and less than 98, the color enhancement factor is 0.30; if the maximum difference is greater than 66 and less than 82, the color enhancement factor is 0.35; if the maximum difference is greater than 50 and less than 66, the color enhancement factor is 0.40; if the maximum difference is greater than 34 and less than 50, the color enhancement factor is 0.45; if the maximum difference is greater than 18 and less than 34, the color enhancement factor is 0.50; if the maximum difference is greater than 8 and less than 18, the color enhancement factor is 0.55; if the maximum difference is less than 8, the color enhancement factor is 0.60. The relation between the maximum difference and the color enhancement factor may be adjusted according to the actual requirement.

For example, if the first red value, the first green value and the first blue value of the image signal to be input to the pixel unit are respectively 100, 150 and 180, the maximum difference among the first red value, the first green value and the first blue value is then 80, and the color enhancement factor is 0.35. If the first red value, the first green value and the first blue value of the image signal to be input to the pixel unit for example are respectively 200, 20 and 18, the maximum difference among the first red value, the first green value and the first blue value is then 182, and the color enhancement factor is 0. If the first red value, the first green value and the first blue value of the image signal to be input to the pixel unit are respectively 10, 55 and 20, the maximum difference among the first red value, the first green value and the first blue value is then 45, and the color enhancement factor is 0.45. Deduced by analogy, each group of the image data may have a corresponding color enhancement factor. Meanwhile, the higher color purity of the original image data is, i.e. the greater the maximum difference is, the smaller the color enhancement factor is. Conversely, the lower color purity of the image data is, i.e. the smaller the maximum difference is, the greater the color enhancement factor is. Therefore, the clipping phenomenon occurred due to excessive color enhancement of the image data with higher color purity may be avoided.

Next, in step 150, the image color is enhanced. First, a first formula, a second formula and a third formula are obtained according to the color enhancement factor. Next, the second red value, the second green value and the second blue value are respectively input to the first formula, the second formula and the third formula to obtain an output red value, an output green value and an output blue value. If the color enhancement factor is S, the second red value is R', the second green value is G', the second blue value is B', the output red value is Ro, the output green value is Go and the output blue value is Bo, the first formula then is Ro=((1+S)×R'−S/2×G'−S/2×B'), the second formula is Go=(−S/2×R'+(1+S)×G'−S/2×B'), and the third formula is Bo=(−S/2×R'−S/2×G'+(1+S)×B').

Actually, the first formula, the second formula and the third formula may be obtained by multiplying two matrixes, calculation thereof is as follows.

$$\begin{bmatrix} Ro \\ Go \\ Bo \end{bmatrix} = \begin{bmatrix} 1+s & -s/2 & -s/2 \\ -s/2 & 1+s & -s/2 \\ -s/2 & -s/2 & 1+s \end{bmatrix} \times \begin{bmatrix} R' \\ G' \\ B' \end{bmatrix}$$

The matrix obtained based on the color enhancement factor is multiplied to the second red value, the second green value and the second blue value, so as to increase the color saturation of the image data. In summary, after the step 150, the output red value, the output green value and the output blue value may present an image with a higher contrast and a higher color saturation compared to that presented by the original first red value, the first green value and the first blue value. Image processing of the present embodiment is independently performed in allusion to the image data of each pixel unit. Therefore, the required memory volume is relatively less. Namely, application of additional large volume memory for image processing is unnecessary, and the cost thereof may be further reduced.

Considering an image processing effect, based on the image processing method of the present embodiment, different color enhancement may be performed on data with different color saturations, so as to avoid the clipping phenomenon of the image information, and present a clear image with a resolution similar to that of the original image. Moreover, the hue of the image data obtained based on the image processing method of the present embodiment maintains the same to that of the original image data. Referring to the following formula for calculation of the image hue:

$$Ho = 60° \times \frac{Go - Bo}{Ro - Bo}$$
$$= 60° \times \frac{\left(-\frac{s}{2}R' + (1+s)G' - \frac{s}{2}B'\right) - \left(-\frac{s}{2}R' - \frac{s}{2}G' + (1+s)B'\right)}{\left((1+s)R' - \frac{s}{2}G' - \frac{s}{2}B'\right) - \left(-\frac{s}{2}R' - \frac{s}{2}G' + (1+s)B'\right)}$$
$$= 60° \times \frac{\left(1 + \frac{s}{2} + s\right)G' - \left(1 + \frac{s}{2} + s\right)B'}{\left(1 + \frac{s}{2} + s\right)R' - \left(1 + \frac{s}{2} + s\right)B'}$$
$$= 60° \times \frac{G' - B'}{R' - B'}$$
$$= H'$$

Wherein, Ho represents the hue of the output image data processed by the image processing method of the present invention, and other symbols are the same to the aforementioned symbols. Based on the above formula, it is known that according to the image processing method of the present invention, a new image with a higher image contrast and a higher color saturation may be obtained while maintaining image hue unchanged.

Second Embodiment

Figure 3:
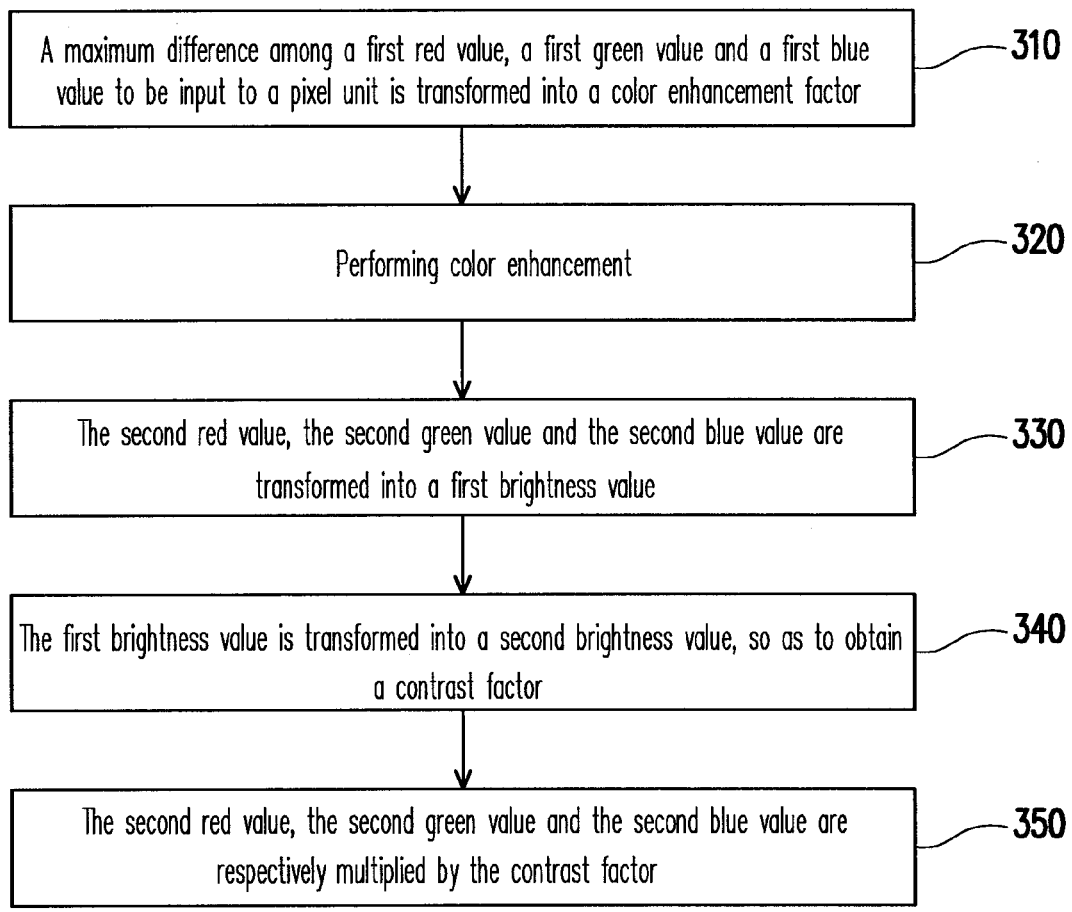
FIG. 3 is a flowchart illustrating another image processing method according to a second embodiment of the present invention.

Certainly, the present invention is not limited to the above image processing method. FIG. 3 is a flowchart illustrating another image processing method according to a second embodiment of the present invention. Referring to FIG. 3, in step 310, a maximum difference among a first red value, a first green value and a first blue value to be input to a pixel unit is transformed into a color enhancement factor. A relationship between the maximum difference and the color enhancement factor is similar to that of the first embodiment, namely, the greater the maximum difference is, the smaller the color enhancement factor is; and the smaller the maximum difference is, the greater the color enhancement factor is. In other words, the higher the color purity of the image data is, the lesser the image data is color enhanced, conversely, the lower the color purity of the image data is, the greater the image data is color enhanced.

Next, in step 320, a color enhancement is performed. A first formula, a second formula and a third formula are obtained based on the color enhancement factor, and the first red value, the first green value and the first blue value are respectively input to the first formula, the second formula and the third formula to obtain a second red value, a second green value and a second blue value. If the color enhancement factor is S, the first red value is R, the first green value is G, the first blue value is B, the second red value is R', the second green value is G' and the second blue value is B', the first formula then is R'=((1+S)×R−S/2×G−S/2×B), the second formula is G'=(−S/2×R+(1+S)×G−S/2×B), and the third formula is B'=(−S/2×R−S/2×G+(1+S)×B). In other words, the color enhancement factor may form a matrix, and the matrix may be multiplied to another matrix formed by the first red value, the first green value and the first blue value, so as to perform color enhancement of the image information by simple calculation, and the calculation may be performed according to the following formula:

$$\begin{bmatrix} R' \\ G' \\ B' \end{bmatrix} = \begin{bmatrix} 1+s & -s/2 & -s/2 \\ -s/2 & 1+s & -s/2 \\ -s/2 & -s/2 & 1+s \end{bmatrix} \times \begin{bmatrix} R \\ G \\ B \end{bmatrix}$$

Next, in step 330, the second red value, the second green value and the second blue value are transformed into a first brightness value. An image signal combination of the second red value, the second green value and the second blue value forms an RGB color space signal, and therefore the first brightness value, i.e. a Y signal may be obtained by transforming the RGB color space signal into a YUV color space signal. In brief, if the second red value is R', the second green value is G' and the second blue value is B', the first brightness value then is Y, and R', G', B' and Y satisfy an equation (1): Y=0.299R'+0.587G'+0.114B'.

Next, in step 340, the first brightness value is transformed into a second brightness value, so as to obtain a contrast factor, wherein the contrast factor is a ratio of the second brightness value and the first brightness value. The method of transforming the first brightness value into the second brightness value is the same to that of the first embodiment, and the detailed description thereof will not be repeated.

Finally, in step 350, the second red value, the second green value and the second blue value are respectively multiplied by the contrast factor to obtain an output red value, an output green value and an output blue value. After the processing steps 310~350, the output image data may have a relatively high contrast and a relatively high color saturation.

Third Embodiment

Figure 4:
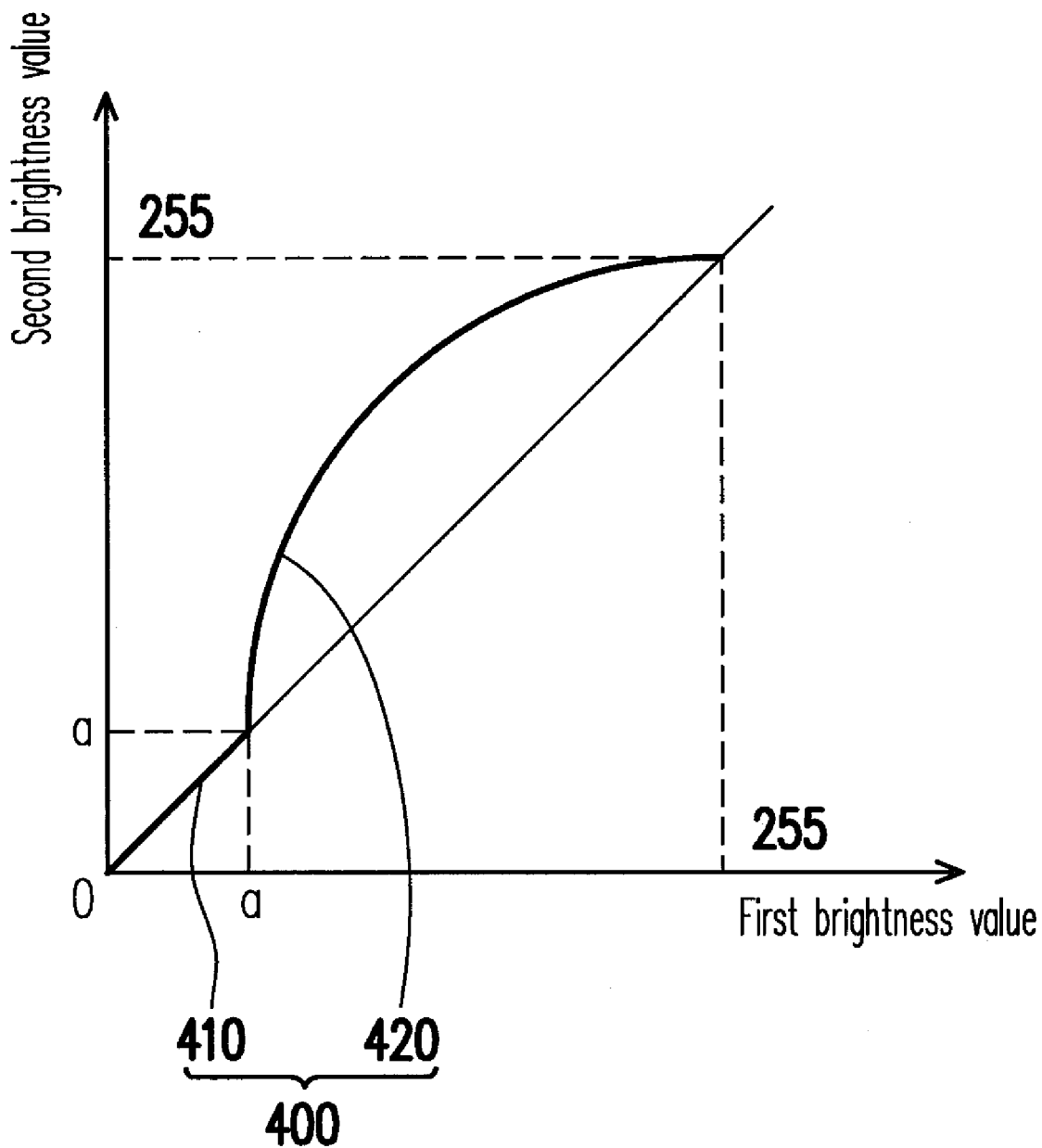
FIG. 4 is a diagram illustrating a curve for a curve function according to the third embodiment of the present invention.

FIG. 4 is a diagram illustrating a curve for a curve function according to the third embodiment of the present invention. The image processing method of the third embodiment according to the present invention is substantially similar to the abovementioned embodiments. Referring to FIG. 4, the curve function 400 using in the image processing method of the third embodiment has a straight segment 410 and a curve segment 420. The straight segment 410 is corresponding to the range between less then "a" and greater then 0 and the curve segment 420 curves downward. According to the embodiment, if the first brightness value is less than "a" and is greater than 0, the second brightness value obtained based on calculation of the curve function 400 is equal to the first brightness value. If the first brightness value is greater than "a" and less than 255, the second brightness value obtained based on calculation of the curve function 400 is greater than the first brightness value. Furthermore, if the first brightness value is "a", 0 or 255, the second brightness value obtained based on calculation of the curve function 400 is equal to the first brightness value. The value of "a" may be varied according to an actual requirement. Other conditions are the same to the aforementioned embodiment, and the detailed description thereof will not be repeated.

In summary, the image processing method of the present invention has at least the following advantages. According to the image processing method of the present invention, the color of the image with high color purity may be slightly enhanced, and the color of the image with low color purity may be greatly enhanced, and therefore the clipping phenomenon of the image is avoided. Moreover, the image processing method of the present invention is suitable for applying to each pixel unit, and each single pixel unit may be individually processed, such that the required memory volume is greatly reduced. In addition, the image processing method of the present invention may sequentially adjust the contrast and the color saturation of the image to present an image with the high contrast and high color saturation. Meanwhile, sequence of contrast improvement and color enhancement is not limited by the present invention. In other words, the image processing method of the present invention may first perform the contrast improvement step and then perform the color enhancement step, or first perform the color enhancement step and then perform the contrast improvement step. Moreover, after performing the image processing steps of the present invention, the hue of the output image maintains the hue of the original image. Namely, the image processing method of the present invention may improve the image contrast and achieve a vivid image effect, and meanwhile distortion of the image is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing method, for individually processing an image of each pixel unit, comprising:
    transforming a red-green-blue color space signal for a pixel unit into a first brightness value, wherein the red-green-blue color space signal comprises a first red value, a first green value and a first blue value;
    transforming the first brightness value into a second brightness value to obtain a contrast factor, wherein the contrast factor is a ratio of the second brightness value and the first brightness value;
    respectively multiplying the first red value, the first green value and the first blue value by the contrast factor to obtain a second red value, a second green value and a second blue value;
    transforming a maximum difference among the first red value, the first green value and the first blue value into a color enhancement factor;
    obtaining a first formula, a second formula and a third formula based on the color enhancement factor; and
    respectively inputting the second red value, the second green value and the second blue value to the first formula, the second formula and the third formula to obtain an output red value, an output green value and an output blue value.

2. The image processing method as claimed in claim 1, wherein the first red value is R, the first green value is G and the first blue value is B, the first brightness value is Y, and R, G, B and Y satisfy an equation (1): Y=0.299R+0.587G+0.114B.

3. The image processing method as claimed in claim 1, wherein the step of transforming the first brightness value into the second brightness value comprises:
    providing a curve function; and
    inputting the first brightness value to the curve function to obtain the second brightness value, wherein if the first brightness value is less than "a" and is greater than 0, the second brightness value obtained based on calculation of the curve function is less than or equal to the first brightness value; if the first brightness value is greater than "a" and less than 255, the second brightness value obtained based on calculation of the curve function is greater than the first brightness value; and if the first brightness value is "a", 0 or 255, the second brightness value obtained based on calculation of the curve function is equal to the first brightness value.

4. The image processing method as claimed in claim 3, wherein a value of "a" is between 0 and 255.

5. The image processing method as claimed in claim 3, wherein a value of "a" is between 60 and 70.

6. The image processing method as claimed in claim 3, wherein a value of "a" is 66.

7. The image processing method as claimed in claim 1, wherein the first brightness value and the second brightness value are respectively between 0 and 255.

8. The image processing method as claimed in claim 1, wherein a relationship between the maximum difference and the color enhancement factor comprises: if the maximum difference is greater than 178, the color enhancement factor is 0; if the maximum difference is greater than 162 and less than 178, the color enhancement factor is 0.05; if the maximum difference is greater than 146 and less than 162, the color enhancement factor is 0.10; if the maximum difference is greater than 130 and less than 146, the color enhancement factor is 0.15; if the maximum difference is greater than 114 and less than 130, the color enhancement factor is 0.20; if the maximum difference is greater than 98 and less than 114, the color enhancement factor is 0.25; if the maximum difference is greater than 82 and less than 98, the color enhancement factor is 0.30; if the maximum difference is greater than 66 and less than 82, the color enhancement factor is 0.35; if the maximum difference is greater than 50 and less than 66, the color enhancement factor is 0.40; if the maximum difference is greater than 34 and less than 50, the color enhancement factor is 0.45; if the maximum difference is greater than 18 and less than 34, the color enhancement factor is 0.50; if the maximum difference is greater than 8 and less than 18, the color enhancement factor is 0.55; if the maximum difference is less than 8, the color enhancement factor is 0.60.

9. The image processing method as claimed in claim 1, wherein if the color enhancement factor is S, the second red value is R', the second green value is G', the second blue value is B', the output red value is Ro, the output green value is Go and the output blue value is Bo, the first formula then is $Ro=((1+S) \times R'-S/2 \times G'-S/2 \times B')$, the second formula is $Go=(-S/2 \times R'+(1+S) \times G'-S/2 \times B')$, and the third formula is $Bo=(-S/2 \times R'-S/2 \times G'+(1+S) \times B')$.

10. An image processing method, for individually processing an image of each pixel unit, comprising:
    transforming a maximum difference among a first red value, a first green value and a first blue value for each pixel unit into a color enhancement factor;
    obtaining a first formula, a second formula and a third formula based on the color enhancement factor;
    respectively inputting the first red value, the first green value and the first blue value to the first formula, the second formula and the third formula to obtain a second red value, a second green value and a second blue value;
    transforming the second red value, the second green value and the second blue value into a first brightness value;
    transforming the first brightness value into a second brightness value to obtain a contrast factor, wherein the contrast factor is a ratio of the second brightness value and the first brightness value; and
    multiplying the second red value, the second green value and the second blue value by the contrast factor to obtain an output red value, an output green value and an output blue value.

11. The image processing method as claimed in claim 10, wherein if the color enhancement factor is S, the first red value is R, the first green value is G, the first blue value is B, the second red value is R', the second green value is G' and the second blue value is B', the first formula then is $R'=((1+S) \times R-S/2 \times G-S/2 \times B)$, the second formula is $G'=(-S/2 \times R+(1+S) \times G-S/2 \times B)$, and the third formula is $B'=(-S/2 \times R-S/2 \times G+(1+S) \times B)$.

12. The image processing method as claimed in claim 10, wherein an relation between the maximum difference and the color enhancement factor comprises: if the maximum difference is greater than 178, the color enhancement factor is 0; if the maximum difference is greater than 162 and less than 178, the color enhancement factor is 0.05; if the maximum difference is greater than 146 and less than 162, the color enhancement factor is 0.10; if the maximum difference is greater than 130 and less than 146, the color enhancement factor is 0.15; if the maximum difference is greater than 114 and less than 130, the color enhancement factor is 0.20; if the maximum difference is greater than 98 and less than 114, the color enhancement factor is 0.25; if the maximum difference is greater than 82 and less than 98, the color enhancement factor is 0.30; if the maximum difference is greater than 66 and less than 82, the color enhancement factor is 0.35; if the maximum difference is greater than 50 and less than 66, the color enhancement factor is 0.40; if the maximum difference is greater than 34 and less than 50, the color enhancement factor is 0.45; if the maximum difference is greater than 18 and less than 34, the color enhancement factor is 0.50; if the maximum difference is greater than 8 and less than 18, the color enhancement factor is 0.55; if the maximum difference is less than 8, the color enhancement factor is 0.60.

13. The image processing method as claimed in claim 10, wherein the step of transforming the first brightness value into the second brightness value comprises:
    providing a curve function; and
    inputting the first brightness value to the curve function to obtain the second brightness value, wherein if the first brightness value is less than "a" and is greater than 0, the second brightness value obtained based on calculation of the curve function is less than or equal to the first brightness value; if the first brightness value is greater than "a" and less than 255, the second brightness value obtained based on calculation of the curve function is greater than the first brightness value; and if the first brightness value is "a", 0 or 255, the second brightness value obtained based on calculation of the curve function is equal to the first brightness value.

14. The image processing method as claimed in claim 13, wherein a value of "a" is between 0 and 255.

15. The image processing method as claimed in claim 13, wherein a value of "a" is between 60 and 70.

16. The image processing method as claimed in claim 13, wherein a value of "a" is 66.

17. The image processing method as claimed in claim 10, wherein the first brightness value and the second brightness value are respectively between 0 and 255.

18. The image processing method as claimed in claim 10, wherein if the second red value is R', the second green value is G' and the second blue value is B', the first brightness value then is Y, and R', G', B' and Y satisfy an equation (1): $Y=0.299R'+0.587G'+0.114B'$.

* * * * *